US008680995B2

(12) United States Patent
G et al.

(10) Patent No.: US 8,680,995 B2

(45) Date of Patent: Mar. 25, 2014

(54) ACCESS CONTROL SYSTEM BASED UPON BEHAVIORAL PATTERNS

(75) Inventors: Ashwin G, Coimbatore (IN); Santhanakrishnan Ponnambalam, Tamilnadu (IN); Sriram Subramanian, Thanjavur (IN); Sivakumar Balakrishnan, Madurai (IN); Valerie Guralnik, Mound, MN (US); Walt Heimerdinger, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 400 days.

(21) Appl. No.: 12/695,542

(22) Filed: Jan. 28, 2010

(65) Prior Publication Data

US 2011/0181414 A1 Jul. 28, 2011

(51) Int. Cl.

*G08B 13/00* (2006.01)
*G05B 19/00* (2006.01)
*G08B 29/00* (2006.01)
*G08B 25/00* (2006.01)
*G06K 9/00* (2006.01)
*G06F 15/173* (2006.01)
*H04L 29/06* (2006.01)
*G06F 21/00* (2013.01)

(52) U.S. Cl.

USPC .......... 340/541; 340/5.2; 340/5.52; 340/5.31; 340/5.8; 382/100; 382/118; 709/224; 713/165; 713/182

(58) Field of Classification Search

USPC .............. 340/541, 545.1, 5.2, 5.3, 5.31, 5.32, 340/5.33, 5.51, 5.52, 5.6, 5.8, 5.82, 555, 340/556, 557, 528, 309.16, 10.1, 572.4, 340/572.7, 825.49, 870.11, 825.31, 825.72; 379/37–44, 47–51, 58, 59, 93, 100; 455/41.2, 404.1, 404.2, 445, 464, 455/552.2, 556.1; 713/165, 182, 168, 193, 713/166

See application file for complete search history.

(56) References Cited

U.S. PATENT DOCUMENTS 6,720,874 B2 * 4/2004 Fufido et al. .................. 340/541
6,867,683 B2 * 3/2005 Calvesio et al. ............. 340/5.52

(Continued)

FOREIGN PATENT DOCUMENTS

JP 2003-293634 10/2003
JP 2005-301928 10/2005

OTHER PUBLICATIONS

Great Britain Intellectual Property Office's Search Report corresponding to Application No. GB1101248.1 dated May 17, 2011.

(Continued)

*Primary Examiner* — Jennifer Mehmood
*Assistant Examiner* — Mirza Alam
(74) *Attorney, Agent, or Firm* — Husch Blackwell LLP

(57) ABSTRACT

A method and apparatus for detecting behavioral changes in a security system is provided. The method includes the steps of providing a secured area having a plurality of security zones where access to each is controlled by an access controller, detecting entrances to at least some of the plurality of security zones by an authorized person through respective access controllers of the plurality of zones over a predetermined previous time period, forming a probability model of entry into each of the plurality of security zones from the detected entrances over the previous time period, detecting access requests for the authorized user from the access controllers during a current time period, and generating a security alert upon determining that an access request of the current access requests exceeds a probability threshold value associated with the probability model.

17 Claims, 2 Drawing Sheets

(56) References Cited

U.S. PATENT DOCUMENTS

| | | | | |
|---|---|---|---|---|
| 2005/0105765 | A1* | 5/2005 | Han et al. | 382/100 |
| 2005/0249382 | A1* | 11/2005 | Schwab et al. | 382/115 |
| 2007/0127787 | A1* | 6/2007 | Castleman et al. | 382/118 |
| 2007/0255818 | A1* | 11/2007 | Tanzer et al. | 709/224 |
| 2007/0272744 | A1* | 11/2007 | Bantwal et al. | 235/382 |
| 2008/0273684 | A1* | 11/2008 | Profanchik | 379/207.02 |
| 2009/0015371 | A1* | 1/2009 | Bocquet et al. | 340/5.2 |

OTHER PUBLICATIONS

English translation of abstract JP 2003-293634.
English translation of abstract JP 2005-301928.

* cited by examiner

ACCESS CONTROL SYSTEM BASED UPON BEHAVIORAL PATTERNS

FIELD OF THE INVENTION

The field of the invention relates to security systems and more particularly to methods of detecting physical access to a protected space.

BACKGROUND OF THE INVENTION

Security systems are generally known. Such systems are typically used in conjunction with a secured area to protect assets and/or people within the secured area.

The secured area is typically protected with a physical barrier (e.g., walls, fences, etc.) extending along a periphery of the secured area. Located along the physical barrier may be one or more access points allowing access into the secured area by authorized persons.

The access points may include some sort of physical entry point (e.g., a door) through which personnel and materials may pass both into and out of the secured area. The access points may each be equipped with a reader device (e.g., a card reader, etc.) and an access control device (e.g., an electrically activated lock) that controls opening of the door.

The secured area may also include one or more interior security areas or zones that divide the secured area into discrete zones. For example, a merchant may use an outer security zone to protect merchandise, while an inner security zone may be used to protect money received from sale of the merchandise within the outer zone. Usually the inner zones are provided with a higher security level than the outer zones.

While such systems work well, they can be defeated in any number of ways. For example, authorized people may enter during non-working hours and perform vandalism. Other authorized people may enter one or more secured areas during working hours or otherwise and improperly remove assets and/or money. Accordingly, a need exists for better methods of tracking access and detecting fraud.

DETAILED DESCRIPTION OF AN ILLUSTRATED EMBODIMENT

Figure 1:
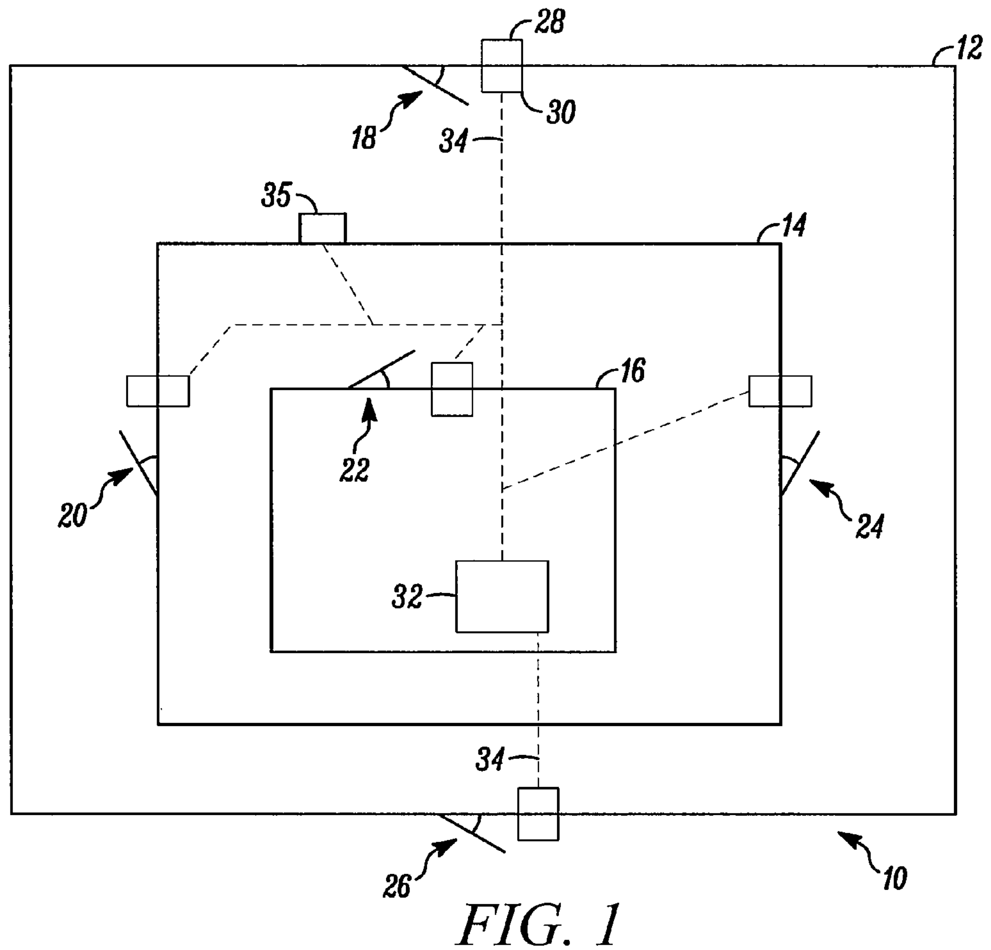
FIG. 1 is a block diagram of a security system in accordance with an illustrated embodiment of the invention.

FIG. 1 is a security system 10 that is used for the protection of a secured area 12 shown generally in accordance with an illustrated embodiment. Included within the secured area 12 may be one or more inner secured areas 14, 16. In general, the secured area 12 may include a first area 16 of a highest security rating, a second security 14 of a second highest security rating and a third outer security area 12.

Each of the security areas 12, 14, 16 may be accessed through one or more access points 18, 20, 22, 24, 26. Each of the access points 18, 20, 22, 24, 26 includes at least an identification reader device 28 for requesting entry to a respective security area 12, 14, 16. The access points 18, 20, 22, 24, 26 may also each include a second identification reader device 30 for exiting the respective security areas 12, 14, 16.

Figure 2:
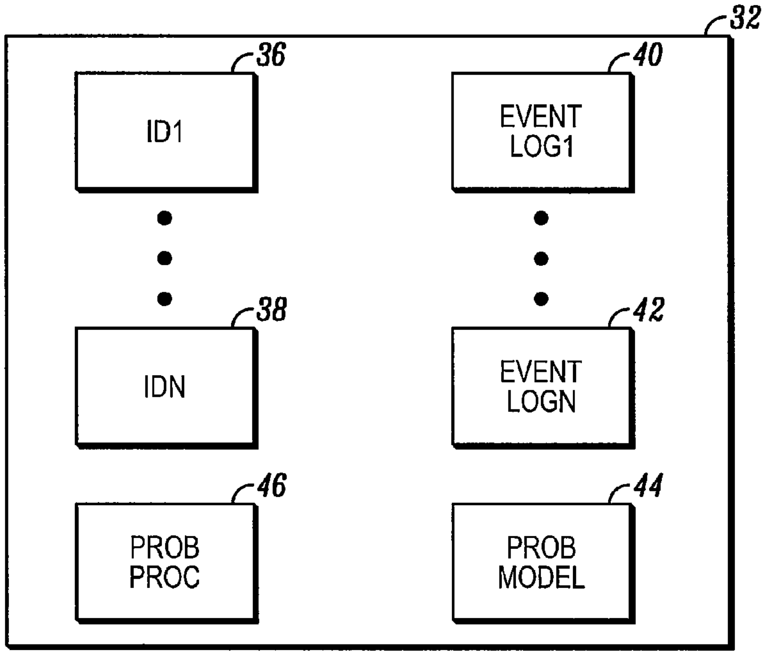
FIG. 2 is a block diagram of a processor of the system of FIG. 1.

The security system 10 also includes a security panel 32. FIG. 2 shows details of the security panel 32. The security panel 32 is connected to each of the reader devices 28, 30 via a communication link 34. The communication link 34 may be either wired or wireless.

In general, a person may request entry into each of the secured area 12, 14, 16 by presenting indicia of identification to one of the readers 28. Similarly, once inside, a person may exit by presenting the indicia of identification to an exit reader 30.

In each case, the indicia of identification is detected by the reader 28, 30 and transferred to the security panel 32. Within the security panel 32, the transferred indicia of identification is compared with the contents of one or more reference identification files 36, 38 to determine if the person is authorized to pass through the access point 18, 20, 22, 24, 26.

The indicia of identification may be provided in the form of an access card carried by the person and presented at an access point 18, 20, 22, 24, 26 for purposes of requesting entry to or egress from the respective security areas 12, 14, 16. The card may be provided with a magnetic strip that is read by the readers 28, 30 or the card may be provided with a radio frequency identification (RFID) chip that simply requires proximity to the reader 28, 30 in order for the reader 28, 30 to read the indicia of identification of the person. Alternatively, the indicia of identification could the person's fingerprint or iris and the readers 28, 30 could be fingerprint or iris scanners.

In general, the system 10 operates to detect and reduce insider threats to organizations that rely upon security systems. This is achieved by modeling the access pattern of a card holding person and comparing the modeled behavior against the current behavior to detect or otherwise determine a deviation.

The system 10 collects information about each person from use of the system 10 and saves the information into an event log 40, 42 for each person. Use information about each user is used to create a behavior profile for the person. Statistical deviations from that profile can be used to detect the possibility of a lost access card being used by an unauthorized party, to the possibility of theft by a cardholder or to the possibility of some other unauthorized act such as vandalism. Once the statistical deviation has been detected, possible responses by the security panel 32 may include video recording the person via a video recorder 35 or blocking access to the secured areas 12, 14, 16.

The event log may have information as shown in Table I in the case where the sample period (quantization level) is one hour.

TABLE I

| | TIME | | | | |
|---|---|---|---|---|---|
| | 8:00 | 9:00 | 10:00 | 11:00 | 12:00 |
| Access Area | 1 | 2 | 2 | 2 | 1 |

This access information for the succession of access events in Table I may be represented by the number string 12221. The string could be expanded to include prior and subsequent events. For example, if an access event in access area 1 were to be detected at 7:00, an event in area 3 were detected at 1:00, an event in area 2 at 2:00 and an event in area 1 at 3:00, then the number string could be extended to be included (e.g., 112223321). This number string (112223321) could be considered as point of a reference point in n-dimensional space (1,1,2,2,2,3,3,2,1). The n-dimension point represents a mathematical or probability model 44 of the access pattern behavior of the card holder over the time period. The normal behavior of the person may be established by averaging the behavior of the person for several days.

Deviations and the differences in deviations from normal behavior can then be determined by comparing a current behavior with the modeled behavior. The current behavior can be represented as another point in n-dimensional space. For example, if the user were to be present in security areas 1, 1, 2, 3, 2, 3, 3, 3, 1 during the corresponding time periods, then the user would have a current point of 1, 1, 2, 3, 2, 3, 3, 3, 1 in n-dimensional space.

The length of the string obtained after sampling can be referred to as m, such that m≤n because during analysis the whole day's data may not be available. If analysis is performed at the end of the day then m and n will be the same (m=n), if not, then the reference behavior string is cropped to its first m values. The result is two strings of length m (i.e., two points in m-dimensional space).

The two m-dimensional points are in the form of base components. The m-dimensional base components may be converted into their corresponding principle components (a principal component is a component in which the data has maximum deviation). The technique for conversion from a base component to a principal component is widely used in data mining and is call a Principle Component Analysis (PCA).

The deviation between the reference m-dimensional principle component and the current m-dimensional principle component may be determined within a probability processor 46 by calculating an appropriate distance (e.g., an Euclidean distance, Manhattan distance, etc.). Where Euclidean distances are used, the Euclidean distance between the two points may be determined using the equation as follows.

$$D(x,y)=\sqrt{\{\Sigma([x(i)-y(i)]^2)\}}\ (i=1 \text{ to } m)$$

X-normal behavior

Y-current behavior.

In this case D(x,y) defines the amount of deviation between the normal behavior and current behavior.

Figure 3:
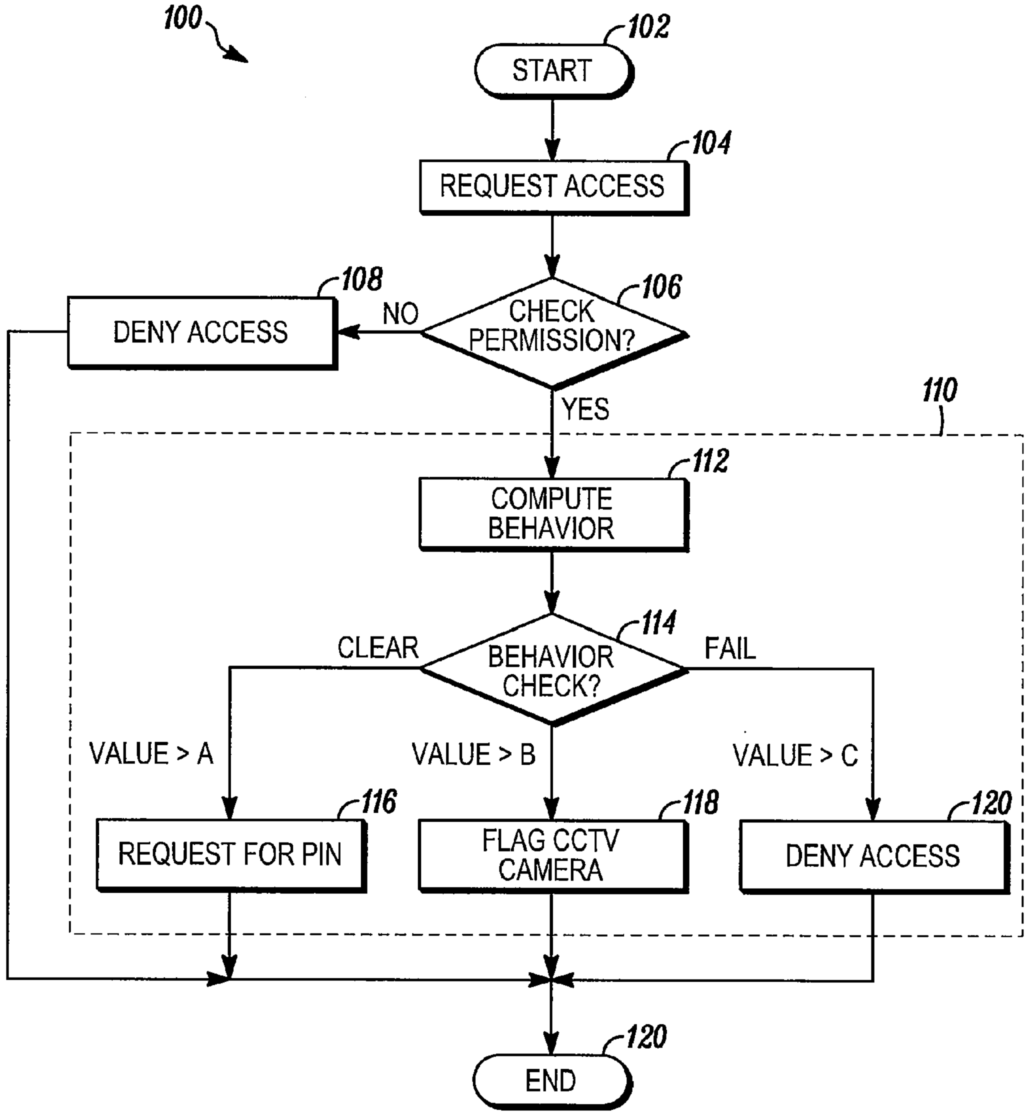
FIG. 3 is a flow chart that depicts method steps that may be used by the system of FIG. 1.

FIG. 3 is a flow chart that depicts a set of steps 100 used by the system 10 during behavior analysis. As a first step 102, the system collects use information to form a reference n-dimensional principle component.

The system 10 detects a current request for access 104 from a reader 28, 30. The indicia of identification is sent to the panel 32 where the indicia of identification of the card holder is compared 106 with the reference identification of the card holder. If the indicia of identification of the card holder from the reader 28, 30 does not match the reference identification, then the request is denied 108.

If the indicia of identification from the reader 28, 30 matches the reference identification, then the behavior of the card holder is determined 110. As a first step, the Euclidean distance, D(x,y) is computed 112. The Euclidean distance, D(x,y) is then compared with a set of deviation threshold values a, b, c. The first threshold, a, represents very little or no deviation from the reference profile. The second threshold, b, represents sufficient deviation to merit a security alert and a third threshold value, c, represents a deviation sufficient to lockout or otherwise deny access 120.

With regard to threshold values a and b, it should be noted that the system 10 requests a personal identification number (PIN) if the Euclidean distance, D(x,y) is greater than a and also if the Euclidean distance, D(x,y) is greater than b. In the first case, if the Euclidean distance, D(x,y) is greater than a, but less than b, then the panel 32 simply grants access to the card holder. On the other hand is the Euclidean distance, D(x,y) is greater than a and b, then the control panel 32 requests 116 the PIN for access and also begins recording 118 an image of the card holder via one or more video cameras 35. On the other hand, if the Euclidean distance, D(x,y) is greater than c, then the control panel 32 denies access 120 to the card holder.

In another embodiment, the frequency of deviation may be determined over a long period of time. In this case, the operator of the system 10 has an established behavior of a card holder defined by a reference n-dimensional point (M) and a series of daily or hourly behaviors of a person defined by many n-dimensional points (together forming a test set). Here there is no case of m≤n as this analysis is performed with an entire day's data.

In this case, the system 10 finds the Euclidean distance between all of the n-dimensional points of the test set and M. First, the system 10 finds two points (A and B) from the test set such that D(A,M) is the maximum and D(B,M) is the minimum (i.e., B is closest to normal behavior and A is furthest from normal behavior).

A and B can be called mean points. Now, the system 10 finds the Euclidean distance between all of the remaining points and A and B.

Next, the system 10 chooses a value, k. The system 10 then finds the first k points closest to A and the first k points closest to B. In this case, a point X is considered close to A if d(X,A)>d(X,B).

Those k points closest to A are abnormal behaviors, the k points closest to B are normal behaviors and the rest are anomalies. The k points closest to B define the reference probability model.

This analysis is performed over a large amount of data. Only then is the data mining effective. Threshold values, a, b, c, are performed as discussed above.

In still another illustrated embodiment, the thresholds, a, b, c, are determined based upon a probability distribution function (PDF) model 44 of normal activity. In this case, the security alert is raised and associated security function implemented (e.g., record card holder activity or deny access to card holder) based upon the correlation of a current activity to the PDF.

In this case, $\hat{T}$ represents the access requests or timestamps (i.e., time and ID of reader 28, 30) of the collected access events, density is the density function calculated for $\hat{T}$ and $\mu$ is the average of all the density values and the actual collected access events (note that the density value is calculated even if no access event is generated at that time). The value of $\mu$ is defined by the equation as follows.

$$\mu = \left\{ \sum_{1}^{1440} \text{density}(t) + \sum_{t \in \hat{T}} \text{density}(t) \right\}.$$

In addition, $\sigma$ is the variance for $\mu$ and $\mu_{sample}$ is the average of all the sampled values (i.e., only the times corresponding to actual collected access event data). The value $\mu_{sample}$ is defined by the equation as follows.

$$\mu_{sample} = \left\{ \sum_{t \in \hat{T}} \text{density}(t) \right\}.$$

In addition, $\sigma_{sample}$ is the variance for $\mu_{sample}$, $\hat{d}$ is the density value at $\hat{t}$ where $\hat{d}$=density($\hat{t}$) and $$\hat{d}_{avg} = \sum_{t=\hat{t}-\delta}^{\hat{t}+\delta} \text{density}(t).$$

In this case, the panel 32 determines values for $\hat{d}$ and for $\hat{d}_{avg}$. If $\hat{d}<\mu-\sigma$, then the alarm panel 32 may generate an alert and begin collecting video images of the card holder. Similarly, if $\hat{d}<\mu-2\sigma$, then the alarm panel 32 may generate an alert and begin collecting video images of the card holder or may deny access to the card holder. Moreover if $\hat{d}_{avg}<\mu-\sigma$ (or if $\hat{d}_{avg}<\mu-2\sigma$ depending upon the preference of the operator of the system 10), then the panel 32 may deny access to the card holder).

In general, the majority of events recorded in access logs by the panel 32 in memory are routine grants of access. Where a person present identifying credentials (usually a badge), the credentials are evaluated by the panel 32 as authorized for the protected spaces 12, 14, 16 and the access point 18, 20, 22, 24, 26 is unlocked. Although individually unremarkable, these events can be analyzed, as discussed above, to detect patterns of daily use and to build models to discriminate between "normal" and unusual activities or behavior. In many cases, it is possible to use routine data to provide evidence for compliance audits, determine occupancy patterns of sensitive areas and to verify presence of multiple persons for two-person security rules. Routine data can be analyzed to determine the effectiveness of the access control system 10, including identifying readers that are ineffective or inoperative.

Other events may pertain either to administration and maintenance of the access system 10 or to exceptional events that should not occur under normal circumstances. These include: use of an invalid badge (expired, revoked or reported as lost) use of a valid badge at an unauthorized time or place, use of a badge in conjunction with a forced door, door left open, etc. Each of these events is worthy of concern by itself, but an analysis of sets of these events collected over time can indicate where security policies are not working as intended.

A specific embodiment of method and apparatus for detecting behavior differences in a security system has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method comprising:

providing a secured area having a plurality of security zones where access to each is controlled by an access controller and where at least some of the plurality of security zones are accessed through at least some other of the plurality of security zones;

detecting entrances to each of the plurality of security zones by an authorized person through respective access controllers of the plurality of zones over a predetermined previous time period;

forming a probability model of entry into each of the plurality of security zones from the detected entrances of the authorized person over the predetermined previous time period;

detecting access requests for the authorized user from the access controllers during a current time period;

generating a security alert upon determining that an access request of the current access requests exceeds a probability threshold value associated with the probability model; and granting access to the secured area by the person upon determining that the probability threshold value is greater than an alerting threshold value and less than a lockout value.

2. The method as in claim 1 further comprising recording a sequence of video images of the person within the secured area.

3. The method as in claim 1 further comprising denying access by the person to the secured area upon determining that the probability threshold value is greater than a lockout value.

4. The method as in claim 1 wherein the probability model further comprises a probability density function.

5. The method as in claim 4 further comprising granting access to the secured area by the person upon determining that a density value of the probability density function at the time of the request for access is less than an average of the detected entrances for a security zone of the plurality of security zones for a corresponding time period minus a variance of the average.

6. The method as in claim 4 further comprising denying access to the secured area by the person upon determining that a density value of the probability density function at the time of the request for access is less than an average of the detected entrances for a security zone of the plurality of security zones for a corresponding time period minus two times a variance of the average.

7. The method as in claim 1 wherein the probability model further comprises a reference set of principal components and the currently detected access requests comprises a current set of principle components using Principal Component analysis.

8. The method as in claim 7 wherein the step of generating the security alert further comprising deteimining a Euclidean distance between each point of the reference and current principle components.

9. The method as in claim 8 further comprising comparing the Euclidean distance with the probability threshold value.

10. An apparatus comprising:

a secured area having a plurality of security zones where access to each is controlled by an access controller and where at least some of the plurality of security zones are accessed through some other of the plurality of security zones;

an event log that contains detected entrances to each of the plurality of security zones by an authorized person through respective access controllers of the plurality of zones over a predetermined previous time period;

a probability model of entry into each of the plurality of security zones formed from the detected entrances of the authorized person over the predetermined previous time period;

access requests for the authorized user received from the access controllers during a current time period;

a security alert that is generated upon determining that an access request of the current access requests exceeds a probability threshold value associated with the probability model; and an access grant allowing the person to enter the secured area upon determining that the probability threshold value is greater than an alerting threshold value and less than a lockout value.

11. The apparatus as in claim 10 further comprising an access denial sent to an access controller of the secured area for the authorized person upon determining that the probability threshold value is greater than a lockout value.

12. The apparatus as in claim 10 wherein the probability model further comprises a probability density function.

13. The apparatus as in claim 12 further comprising an access grant to the secured area by the person sent to an access controller of the access controllers upon determining that a density value of the probability density function at the time of the request for access is less than an average of the detected entrances for a security zone of the plurality of security zones for a corresponding time period minus a variance of the average.

14. The method as in claim 12 further comprising an access denial to the secured area by the person sent to an access controller of the access controllers upon determining that a density value of the probability density function at the time of the request for access is less than an average of the detected entrances for a security zone of the plurality of security zones for a corresponding time period minus two times a variance of the average.

15. The method as in claim 10 wherein the probability model further comprises a reference set of principal components and the currently detected access requests comprises a current set of principle components using Principal Component analysis.

16. The method as in claim 15 wherein the generated the security alert further comprises a probability processor that determines a Euclidean distance between each point of the reference and current principle components.

17. The method as in claim 16 further comprising comparing the Euclidean distance with the probability threshold value.

* * * * *